United States Patent
Ross et al.

(10) Patent No.: US 7,621,546 B2
(45) Date of Patent: Nov. 24, 2009

(54) ILLUMINATING BRACKET FOR USE WITH A RUNNING BOARD OR STEP

(75) Inventors: Christopher Paul Ross, Macomb, MI (US); James Walter Shelswell, Barrie (CA); Cole Joseph Cunnien, Canton, MI (US); Dino Filias, Sterling Heights, MI (US)

(73) Assignee: Magna International Inc., Aurora, Ontario (CA)

( * ) Notice: Subject to any disclaimer, the term of this patent is extended or adjusted under 35 U.S.C. 154(b) by 124 days.

(21) Appl. No.: 11/590,517

(22) Filed: Oct. 31, 2006

(65) Prior Publication Data
US 2008/0100023 A1    May 1, 2008

(51) Int. Cl.
*B60R 3/00* (2006.01)
*B60R 21/00* (2006.01)
*B60P 1/43* (2006.01)
*B65F 3/04* (2006.01)

(52) U.S. Cl. .................. 280/166; 280/163; 280/727; 414/546

(58) Field of Classification Search ............. 280/166, 280/163, 727; 362/511; 414/546
See application file for complete search history.

(56) References Cited

U.S. PATENT DOCUMENTS

| | | | | |
|---|---|---|---|---|
| 1,136,583 A * | 4/1915 | Blake | ................. | 362/481 |
| 4,116,457 A * | 9/1978 | Nerem et al. | ................ | 280/166 |
| 4,463,962 A * | 8/1984 | Snyder | ................. | 280/164.1 |
| 4,557,494 A * | 12/1985 | Elwell | ................. | 362/495 |
| 4,819,136 A | 4/1989 | Ramsey | | |
| 4,838,567 A * | 6/1989 | Michanczyk | ................. | 280/163 |
| 5,915,830 A * | 6/1999 | Dickson et al. | ................. | 362/495 |
| 5,927,240 A * | 7/1999 | Maxon | ................. | 123/179.3 |
| 6,179,454 B1 | 1/2001 | Hoines | | |
| 6,250,785 B1 * | 6/2001 | Mallia et al. | ................. | 362/511 |
| 7,422,408 B2 * | 9/2008 | Sobota et al. | ................. | 414/546 |
| 2005/0238471 A1 * | 10/2005 | Ablabutyan et al. | ................. | 414/546 |
| 2008/0116653 A1 * | 5/2008 | Piotrowski | ................. | 280/166 |

* cited by examiner

*Primary Examiner*—Paul N Dickson
*Assistant Examiner*—John R Olszewski
(74) *Attorney, Agent, or Firm*—Clark Hill PLC

(57) ABSTRACT

A running board assembly is provided for a motor vehicle. The running board assembly includes a mounting bracket adapted to be fixedly secured to the motor vehicle. The running board assembly also includes a step having a stepping surface. A link includes an upper end coupled to the mounting bracket and an opposing lower end coupled to the step. A light source is fixedly mounted to the link for illuminating the stepping surface to allow users to locate the step.

20 Claims, 6 Drawing Sheets

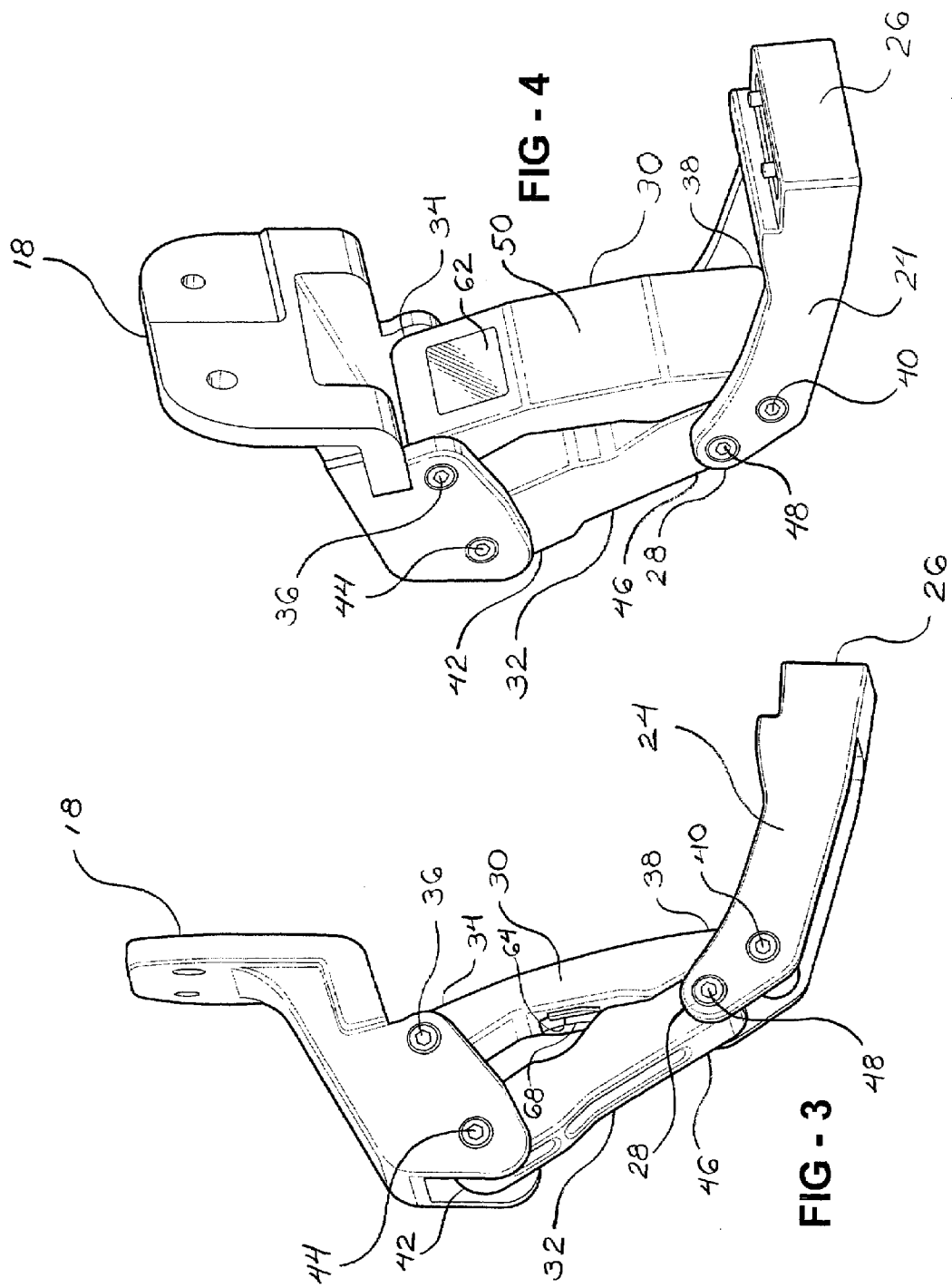

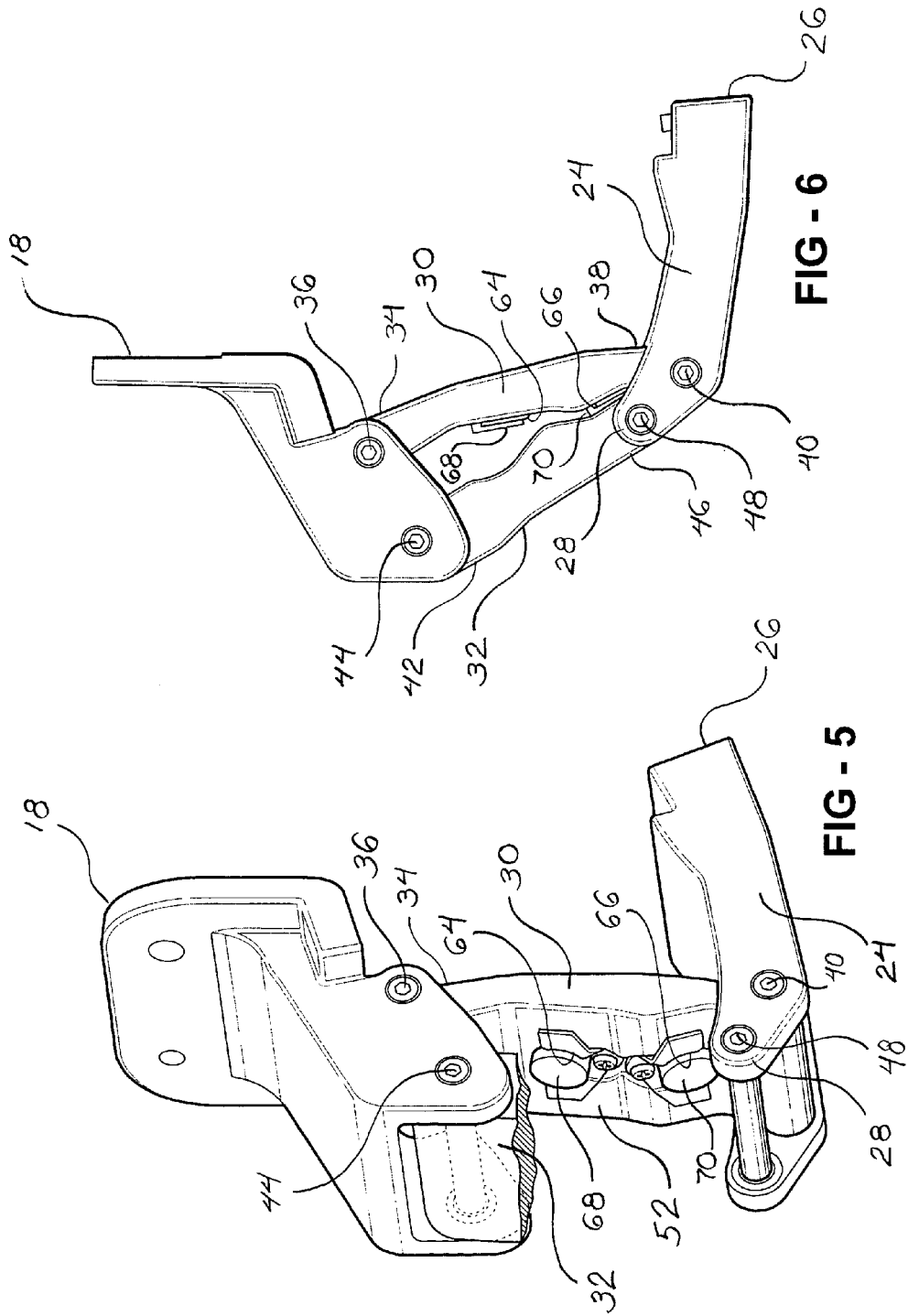

ILLUMINATING BRACKET FOR USE WITH A RUNNING BOARD OR STEP

BACKGROUND OF THE INVENTION

1. Field of the Invention

The invention relates to a running board assembly for a motor vehicle. More particularly, the invention relates to a running board assembly including a light source coupled to a link for illuminating a stepping surface of a step.

2. Description of Related Art

Retractable running boards are popular accessories for certain motor vehicles having a high ground clearance, such as pickup trucks and sport utility vehicles. These retractable running boards generally move between a retracted position tucked against a body panel of the motor vehicle and an extended position spaced apart from the body panel for supporting individuals entering and exiting the motor vehicle. It is, therefore, desirable to illuminate these running boards when in the extended position in order to allow users to locate a stepping surface at night.

Various lighted running boards are known to those skilled in the art. Examples of such lighted running boards are found in U.S. Pat. No. 4,463,962 to Snyder; U.S. Pat. No. 4,819,136 to Ramsey; U.S. Pat. No. 5,915,830 to Dickson et al.; U.S. Pat. No. 6,179,454 to Hoines; and U.S. Pat. No. 6,250,785 to Mallia et al.

SUMMARY OF THE INVENTION

According to one aspect of the invention, a running board assembly for a motor vehicle includes a mounting bracket adapted to be fixedly secured to the motor vehicle. The running board assembly also includes a step having a stepping surface. A link includes an upper end coupled to the mounting bracket and a lower end coupled to the step. A light source is fixedly mounted to the link for illuminating the stepping surface to allow a user to locate the step.

BRIEF DESCRIPTION OF THE DRAWINGS

The invention will be readily appreciated as the same becomes better understood by reference to the following detailed description when considered in connection with the accompanying drawings wherein:

FIG. 3 is a perspective view of a mounting bracket, link, and first and second arms of the running board assembly;

FIG. 4 is a front, perspective view of the mounting bracket, link, and first and second arms of the running board assembly;

FIG. 5 is a rear, perspective view, with the second arm partially cut away, of the mounting bracket, link, and first arm;

FIG. 6 is a side view of the mounting bracket, link, and first and second arms of the running board assembly;

DETAILED DESCRIPTION OF THE PREFERRED EMBODIMENT

Figure 1:
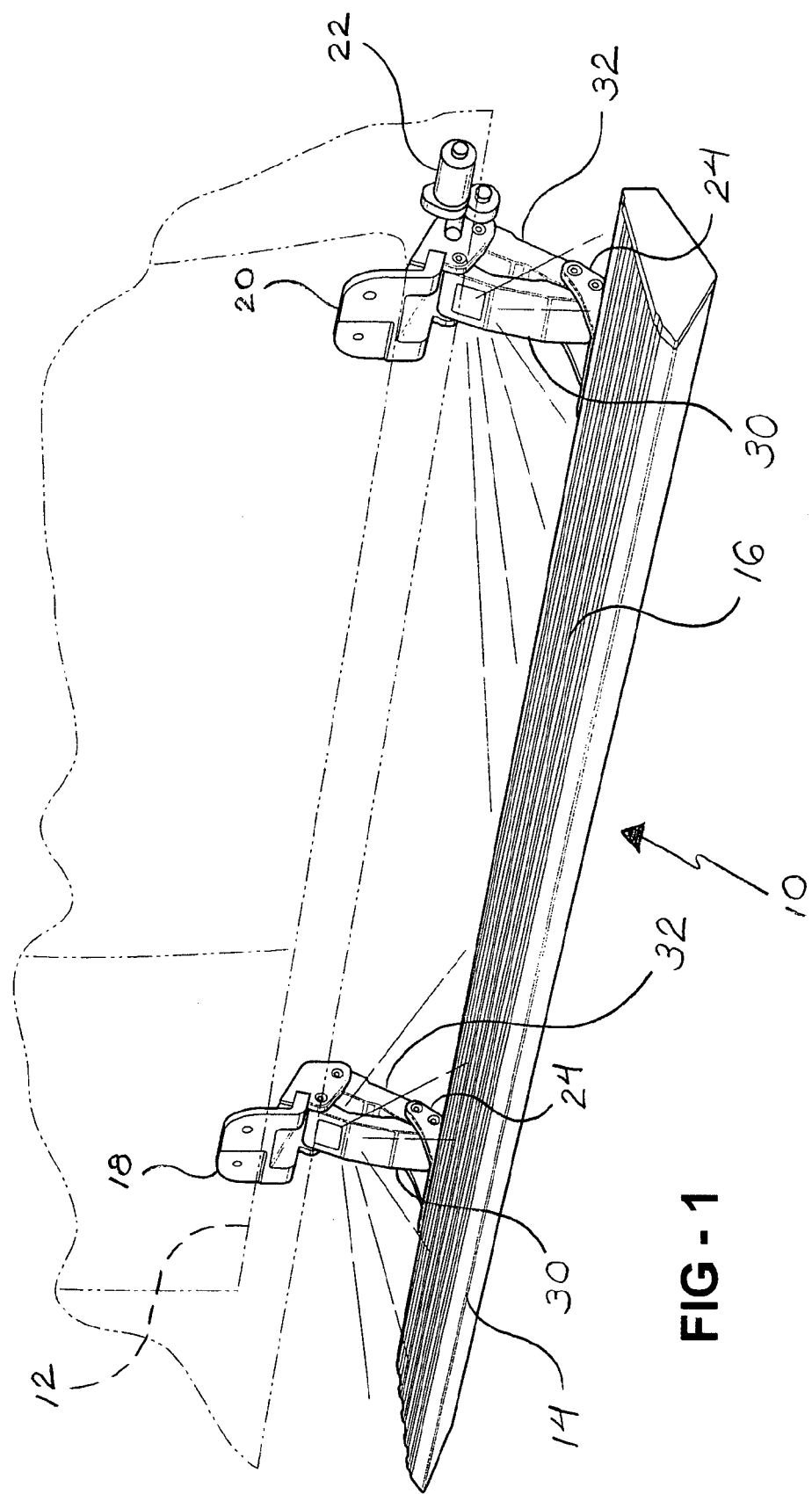
FIG. 1 is a perspective view of a running board assembly according to the invention in an extended position.
Figure 2:
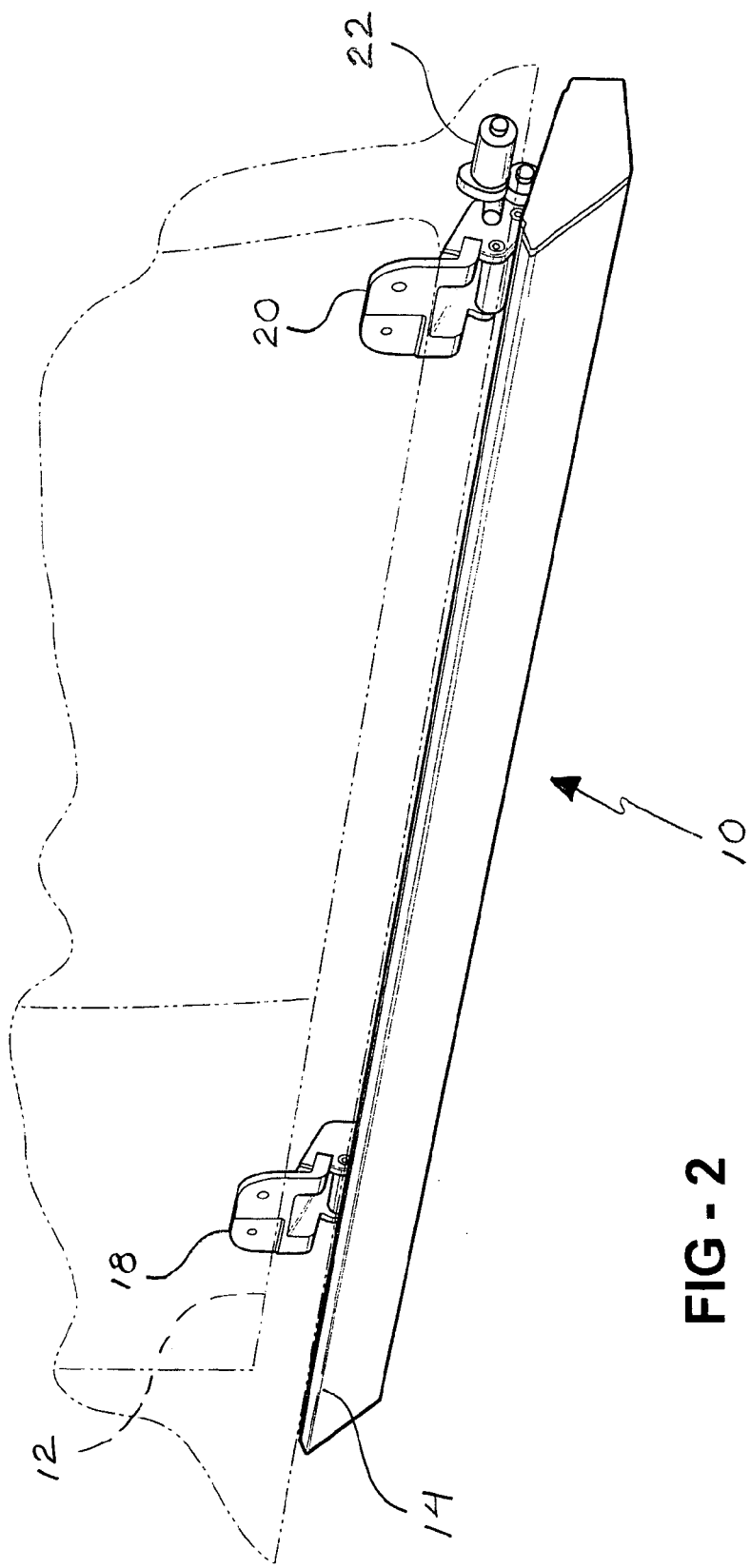
FIG. 2 is a perspective view of the running board assembly in a retracted position.

Referring to FIGS. 1 and 2, a running board assembly, generally shown at 10, is adapted to be mounted to an underbody 12 of a motor vehicle. The running board assembly 10 includes a step or deck 14 having a stepping surface 16. The step 14 is movable between an extended position, as shown in FIG. 1, in which the stepping surface 16 is available for supporting individuals entering and exiting the motor vehicle and a retracted position, as shown in FIG. 2, in which the stepping surface 16 is largely hidden from view. It is appreciated that the size and shape of the step or deck 14 may vary.

The running board assembly 10 includes a pair of mounting brackets 18, 20 adapted to be fixedly secured to the underbody 12 of the motor vehicle. The mounting brackets 18, 20 are spaced apart from one another in order to distribute forces on the running board assembly 10 along the underbody 12 of the motor vehicle. A motor 22 is mounted to one of the mounting brackets 20 to provide powered movement of the step 14 between the extended and retracted positions. Although two mounting brackets 18, 20 are disclosed, it is appreciated that the number of mounting brackets utilized with the running board assembly 10 may vary. Since the mounting brackets 18, 20 are identical, the following description refers only to the mounting bracket 18 with the understanding that the same applies equally to the other mounting bracket 20.

Referring to FIGS. 3 through 6, an arm 24 is operably coupled to the mounting bracket 18. The arm 24 includes an outboard end 26 fixedly secured to the step 14 and an opposing inboard end 28. The arm 24 supports the step 14 during movement thereof between the extended and retracted positions.

The running board assembly 10 also includes first 30 and second 32 links each pivotally interconnected between the mounting bracket 18 and the inboard end 28 of the arm 24. The first link 30 is located outboard of the second link 32. The first link 30 includes an upper end 34 pivotally coupled to the mounting bracket 18 about a pivot pin 36 and an opposing lower end 38 pivotally coupled to the arm 24 about a pivot pin 40. The second link 32 includes an upper end 42 pivotally coupled to the mounting bracket 18 about a pivot pin 44 and an opposing lower end 46 pivotally coupled to the arm 24 about a pivot pin 48. The pivotal movement of the first 30 and second 32 links about the respective pivot pins 36, 40 and 44, 48 moves the step 14 between the extended and retracted positions.

Figure 7:
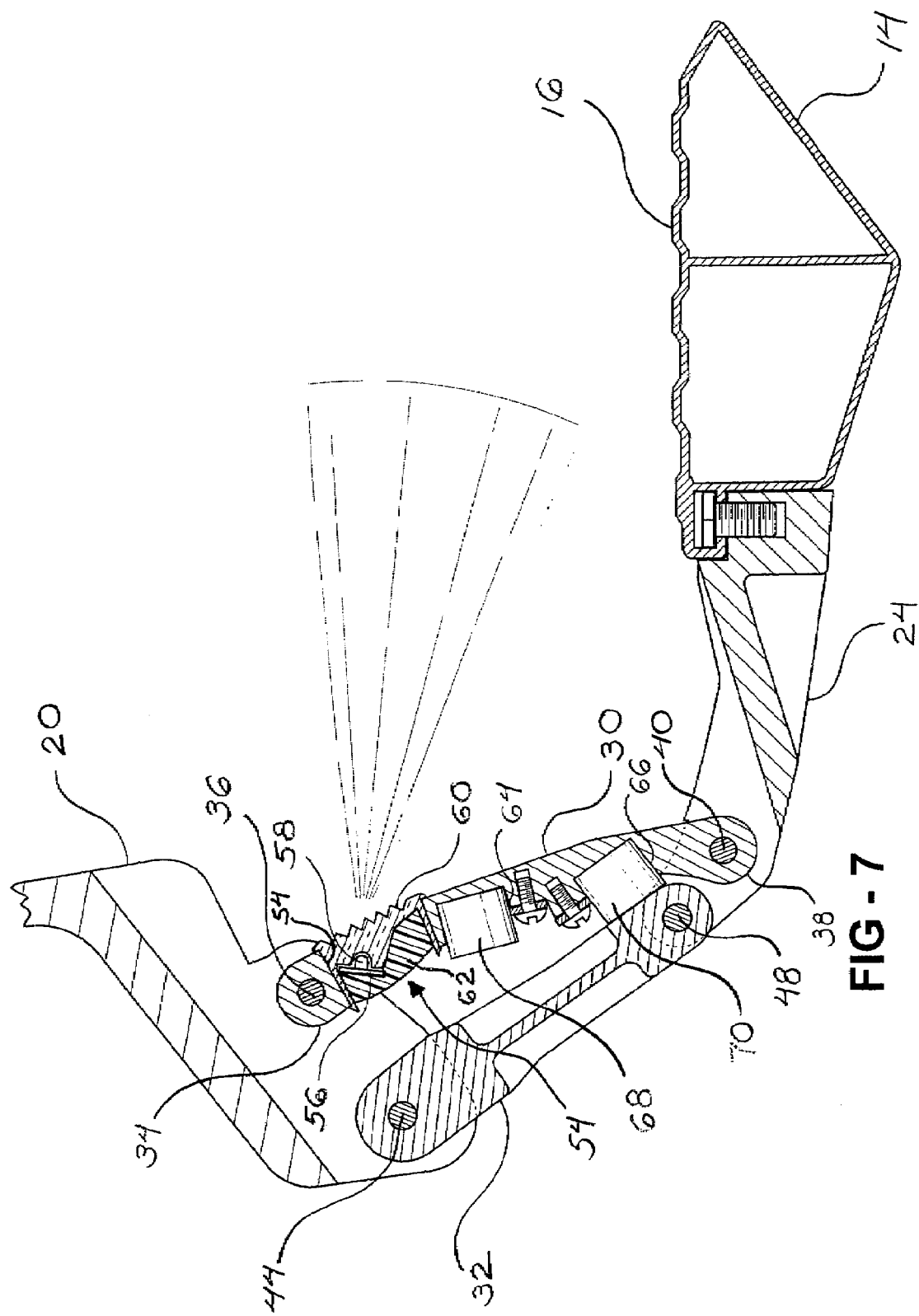
FIG. 7 is a sectional view including the mounting bracket and the link, and a light source disposed within an opening in the first link.
Figure 8:
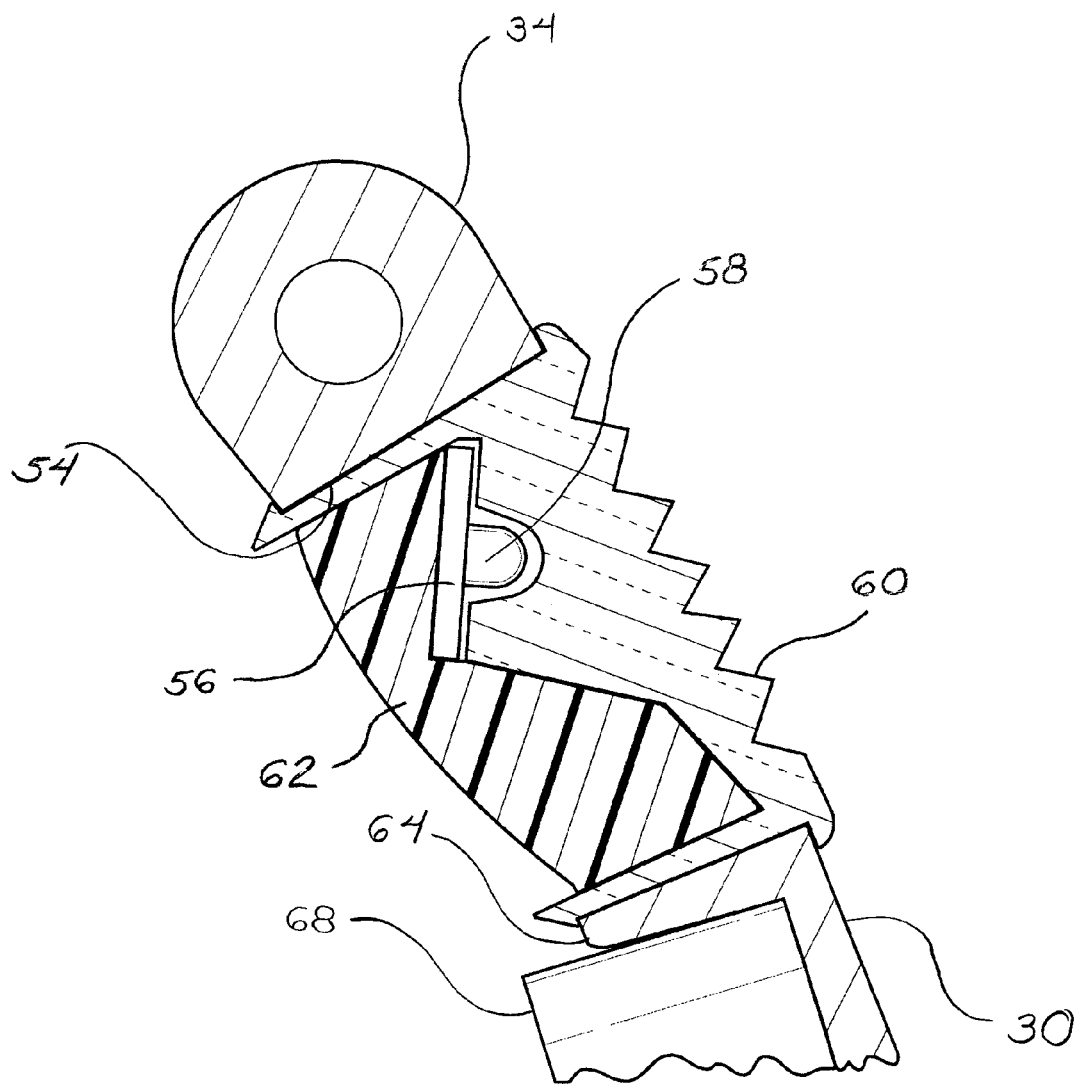
FIG. 8 is an enlarged view of FIG. 7 including the light source within the opening.

The first link 30 includes an outboard surface 50 and an opposing inboard surface 52. Referring to FIGS. 7 and 8, the first link 30 defines an opening 54 adjacent the upper end 34. The opening 54 may be placed at any of various locations along the first link 30, i.e., at a location adjacent the lower end 38 or at any location between the upper 34 and lower 38 ends. In addition, the opening 54 formed in the first link 30 may be any of numerous shapes and sizes.

A printed circuit board 56 is positioned inside the opening 54. The printed circuit board 56 supports a light source 58 within the opening 54. Preferably, the light source 58 is an L.E.D. A lens 60 is fixedly mounted along the outboard surface 50 of the first link 32 to cover the opening 54. Light rays emitted from the light source 58 are directed by the lens 60 in a predetermined path. More specifically, upon activation of the light source 58, the lens 60 directs light rays towards the step 14 to illuminate the stepping surface 16 thereof. Preferably, activation of the light source 58 corresponds with movement of the step 14 such that the light source 58 is turned on as the step 14 moves to the extended position. As a result, users are able to clearly locate the stepping surface 16 of the step 14 while entering and exiting the vehicle at night or in low lighting conditions.

A potting compound 62 fills the interior of the opening 54 adjacent the inboard surface 52 of the first link 32. Preferably, the potting compound 62 is a non-conductive, soft epoxy that insulates the printed circuit board 56 from contaminants and shock. The potting compound 62 firmly engages the printed circuit board 56 and integrally maintains the various components within the opening 54. It is appreciated that although the potting compound 62 has been disclosed, various structures formed from any of numerous materials may be utilized in to fill the interior of the opening 54 adjacent the inboard surface 52 of the first link 32.

The lens 60 and the potting compound 62 completely enclose the light source 58 within the opening 54. Therefore, the light source 58 is protected from damage that could otherwise by caused by users or the outside environment.

Referring to FIGS. 5 through 7, upper 64 and lower 66 bumper housings are positioned along the inboard surface 52 of the first link 30. First 68 and second 70 bumpers are disposed within the respective upper 64 and lower 66 bumper housings. The first 68 and second 70 bumpers cushion the contact between the first 30 and second 32 links that occurs as the step 14 moves between the extended and retracted positions. In addition, the first 68 and second 70 bumpers also assist in protecting the light source 58 by reducing the impact forces that would otherwise be produced by contact between the first 30 and second 32 links during movement of the step 14 between the extended and retracted positions.

The invention has been described in an illustrative manner. It is to be understood that the terminology, which has been used, is intended to be in the nature of words of description rather than of limitation. Many modifications and variations of the invention are possible in light of the above teachings. Therefore, within the scope of the appended claims, the invention may be practiced other than as specifically described.

What is claimed:

1. A running board assembly for a motor vehicle, said running board assembly comprising:
   a mounting bracket adapted to be fixedly secured to the motor vehicle;
   a step having a stepping surface;
   a link having an upper end coupled to said mounting bracket and an opposing lower end coupled to said step, said link defining an opening; and
   a light source received within said opening and housed entirely therewithin for illuminating said stepping surface to allow users to locate said step.

2. A running board assembly as set forth in claim 1 including a lens fixedly secured to said link over said opening for directing light rays from said light source to said stepping surface.

3. A running board assembly as set forth in claim 2 including a printed circuit board fixedly mounted within said opening for supporting said light source.

4. A running board assembly as set forth in claim 3 including a potting compound disposed within said opening for insulating said printed circuit board.

5. A running board assembly as set forth in claim 4 wherein said link includes at least one bumper fixedly secured thereto for absorbing vibrations produced as said link contacts a different portion of said running board assembly.

6. A running board assembly as set forth in claim 5 wherein said link defines at least one bumper housing for receiving said at least one bumper therewithin.

7. A running board assembly as set forth in claim 6 including an arm pivotally coupled to said link and fixedly secured to said step.

8. A running board assembly for a motor vehicle, said running board assembly comprising:
   a mounting bracket adapted to be fixedly secured to the motor vehicle;
   a step having a stepping surface;
   first and second links each pivotally interconnected between said mounting bracket and said step for moving said step between a retracted position in which said stepping surface is spaced apart from an underbody of the motor vehicle and a retracted position in which said stepping surface abuts the underbody of the motor vehicle, said first link defining an opening; and
   a light source received within said opening and housed entirely therewithin for illuminating said stepping surface to allow a user to locate said step when said step is in said extended position.

9. A running board assembly as set forth in claim 8 wherein said first link includes an inboard surface facing said second link and an opposing outboard surface.

10. A running board assembly as set forth in claim 9 including a lens covering said opening along said outboard surface for directing light rays from said light source towards said stepping surface, said lens flush with said outboard surface of said first link.

11. A running board assembly as set forth in claim 10 including a printed circuit board fixedly mounted within said opening for supporting said light source.

12. A running board assembly as set forth in claim 11 including a potting compound disposed within said opening for insulating said printed circuit board.

13. A running board assembly as set forth in claim 12 including a bumper positioned along said inboard surface of said first link to cushion contact between said first link and a different portion of said running board assembly.

14. A running board assembly as set forth in claim 13 wherein said first link defines a bumper housing along said inboard surface for receiving said bumper therewithin.

15. A running board assembly as set forth in claim 8 including a first bumper positioned along said inboard surface of said first link for cushioning contact between said first and second links when said step is in said retracted position.

16. A running board assembly as set forth in claim 15 including a second bumper positioned along said inboard surface for cushioning contact between said first and second links when said step is in said extended position.

17. A running board assembly as set forth in claim 16 wherein said first link defines spaced apart first and second bumper housings along said inboard surface for receiving said respective first and second bumpers.

18. A running board assembly for a motor vehicle, said running board assembly comprising:
   a step having a stepping surface;
   a link having an upper end coupled to the motor vehicle and an opposing lower end coupled to said step, said link defining an opening; and a light source received within said opening and housed entirely therewithin for illuminating said stepping surface to allow users to locate said step.

19. A running board assembly as set forth in claim 18 including a lens fixedly secured to said link over said opening for directing light rays from said light source to said stepping surface.

20. A running board assembly as set forth in claim 19 including a printed circuit board fixedly mounted within said opening for supporting said light source.

* * * * *